United States Patent [19]
Karp et al.

[11] Patent Number: 6,158,640
[45] Date of Patent: Dec. 12, 2000

[54] ELONGATED SHOPPING CART ATTACHMENT HAVING OPPOSING TONGUES

[75] Inventors: Geoffrey H. Karp, Avon, Conn.; Jason Karp, New York, N.Y.

[73] Assignee: Hands-On-Media L.L.C., Avon, Conn.

[21] Appl. No.: 09/275,489

[22] Filed: Mar. 24, 1999

Related U.S. Application Data

[63] Continuation-in-part of application No. 09/200,502, Nov. 25, 1998.

[51] Int. Cl.[7] .......................................... B60R 7/00
[52] U.S. Cl. ........................... 224/411; 24/20 TT; 24/939; 248/230.1; 224/277; 224/572
[58] Field of Search ............................ 248/230.2, 230.1; 24/20 TT, 939; 280/33.992; 224/411, 277, 572, 567, 570

[56] References Cited

U.S. PATENT DOCUMENTS

| | | |
|---|---|---|
| D. 355,063 | 1/1995 | Pirnat . |
| 3,881,267 | 5/1975 | Hicks . |
| 4,443,961 | 4/1984 | Gilroy . |
| 4,496,058 | 1/1985 | Harris et al. . |
| 4,502,186 | 3/1985 | Clarke et al. ...................... 24/20 TT X |
| 4,557,024 | 12/1985 | Roberts et al. ................... 24/20 TT X |
| 4,848,117 | 7/1989 | Welborn et al. . |
| 4,858,353 | 8/1989 | Krebs et al. . |
| 4,935,992 | 6/1990 | Due ................................. 24/20 TT X |
| 5,086,960 | 2/1992 | Schwietzer . |
| 5,566,609 | 10/1996 | Kirschner . |

*Primary Examiner*—Stephen K. Cronin
*Assistant Examiner*—Robin A. Hylton
*Attorney, Agent, or Firm*—Cantor Colburn LLP

[57] ABSTRACT

A low cost shopping cart attachment having an indicia display area along with a shopping list, coupon, circular holder. The shopping cart attachment is intended to removably attach onto a shopping cart handle facing a shopper that is pushing on the handle of the shopping cart so that the indicia display area and the papers releasably retained in the shopping list, coupon, circular holder are easily viewed by the shopper. The indicia area is designed to hold advertising which is preferably changed periodically to enhance the sale of a product or promotional items.

8 Claims, 7 Drawing Sheets

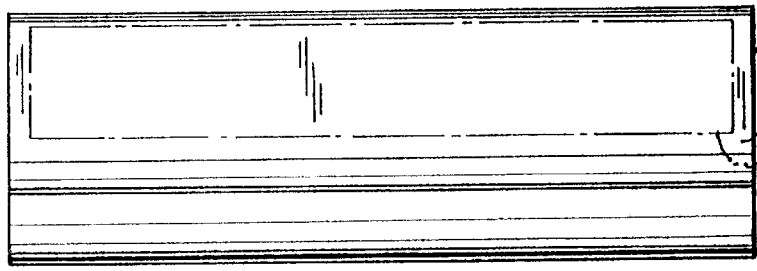
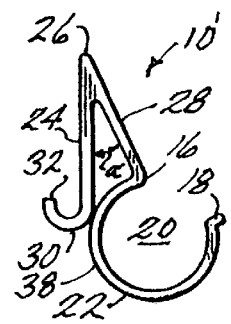
FIG. 5          FIG. 4
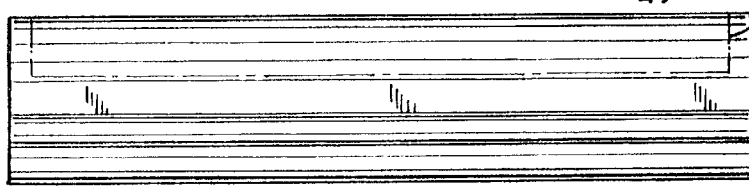
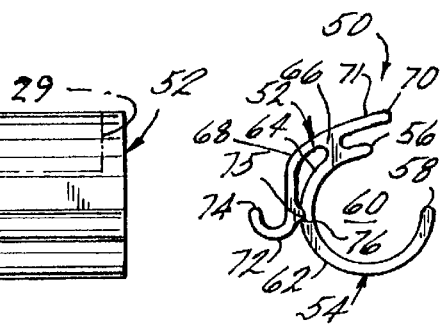
FIG. 7          FIG. 6
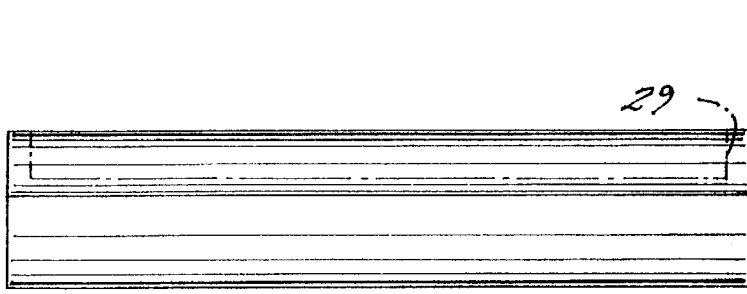
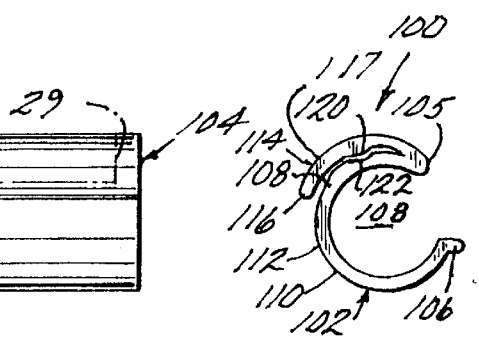
FIG. 9          FIG. 8

ELONGATED SHOPPING CART ATTACHMENT HAVING OPPOSING TONGUES

CROSS REFERENCE TO RELATED APPLICATIONS

This application is a continuation-in-part of copending U.S. patent application Ser. No. 09/200,502 filed on Nov. 25, 1998 and which is herein incorporated by reference in its entirety.

TECHNICAL FIELD

This invention relates generally to shopping cart attachments. More particularly, this invention relates to a shopping cart list, coupon and circular holder with indicia display area device snap-lockable to a shopping cart handle.

BACKGROUND OF THE INVENTION

There is a multiplicity or prior art devices known, whose purpose is to provide holding means for shopping lists, coupons, circulars and the like. Examples of this prior art are contained in U.S. Design Pat. No. DES. 355,063 to Pirnat; U.S. Pat. Nos. 3,881,267 to Hicks; 4,443,961 to Gilroy; 4,496,058 to Harris; 4,848,117 to Welborn et al; 5,086,960 to Schwietzer and 5,566,609 to Kirschner. It should be noted the above are only a small sampling of the prior art but are typical examples thereof.

All of the above prior art have in common the following three elements (1) a planar surface for writing on a shopping list; (2) means for holding coupons, circulars and the like and (3) means for attachment and/or resting the device securely to a shopping cart. All of these devices are of designs of varying complexity and cost of fabrication but even the simplest of these devices having a multiplicity of elements and are relatively costly to manufacture.

The primary purpose of all of these prior art devices is to provide convenient means for the shopper to hold coupons, circulars and the like and to hold a shopping list and means for providing a surface to mark off the shopping list with a pen or pencil while shopping.

Regardless of the differences in the prior art, whether meant to be permanently attached to the shopping cart and then removed to be taken home with the shopper or otherwise, the devices main function is to provide a convenient means for holding circulars, lists and coupons and means for checking off the list as shopping progresses.

Recently in-store advertising has increased at a very rapid rate. Except for one or two exceptions, there is currently no advertising medium that stares the consumer in the face as he or she shops. All of the different types of stores which utilize shopping carts resort to a variety of in-store advertisements that often go unnoticed by the shoppers. These in-store advertisements are located on walls, floors, aisles and on the front of the shopping carts but strikes in the industry show that these methods of advertising do not grab the attention of the shopper. In spite of this, advertisers are currently paying very high rates for the aforementioned advertisements with little measurable success.

Although the majority of the billions of dollars spent yearly are allocated between mediums such as newspapers, magazines, radio and television, the ability to judge the effectiveness of these mediums (newspapers, magazines, radio and television) is marginal at best. However, with its retail information infrastructure, in-store advertising's effectiveness is more easily measured and is gradually gaining favor with advertisers. Moreover, it has been found that the majority of brand-buying decisions occur within the particular store during the shopping experience. Therefore, there is a perceived need for an extremely low cost in-store advertising device that also includes functional utility.

None of the prior art known to the inventor provide an extremely low cost per unit device having an indicia space directly visible to the shopper as he/she shops with emphasis on renewable advertisements as well as a simple means for holding coupons, lists, circulars and the like and, therefore, as stated hereinbefore, there is a perceived need for such a device.

SUMMARY OF THE INVENTION

The above-discussed and other problems and deficiencies of the prior art are overcome or alleviated by the shopping cart attachment of the present invention which includes an indicia display area in combination with a shopping list, coupon, circular holder.

In accordance with the present invention, a low cost shopping cart attachment having an indicia display area in combination with a shopping list, coupon, circular holder is provided. Importantly, the attachment includes an area for indicia display and the device is adapted to removably attach onto a shopping cart handle facing a shopper that is pushing on the handle of the shopping cart and the shopping list, coupon, circular holder is also positioned to permits the shopper to easily view these papers. The indicia area is designed to hold advertising which is preferably changed periodically to enhance the sale of a product or promotional items.

The device is preferably made of durable plastic so that once the device has been mounted onto a shopping cart handle, it will remain on the handle and will not be readily damaged by a child in the shopping cart seating space nor damaged by meteorological elements by prolonged exposure when used or stored outdoors. It is intended that the indicia can be changed periodically with ease to keep the indicia message fresh at low cost.

In addition, a feature of the extremely low cost of the shopping cart list, coupons, circular holder with indicia display area device of the present invention is the low cost achieved by the design allowing the use of such manufacturing methods as extrusion.

The above-discussed and other features and advantages of the present invention will be appreciated and understood by those of ordinary skill in the art from the following detailed discussion and drawings.

BRIEF DESCRIPTION OF THE DRAWINGS

Referring now to the drawings, wherein like elements are numbered alike in the several FIGURES:

FIG. 4 is a right side elevation view of a second embodiment of a shopping cart list, coupon, circular holder with indicia display area device of the present invention;

FIG. 5 is a front elevation of the device of FIG. 4;

FIG. 6 is right side elevation view of a third embodiment of a shopping cart list, coupon, circular holder with indicia display area device of the present invention;

FIG. 7 is a front elevation view of the device of FIG. 6;

FIG. 8 is a right side elevation view of a fourth embodiment of a shopping cart list, coupon, circular holder with indicia display area device of the present invention;

FIG. 9 is a front elevation view of the device of FIG. 8;

DETAILED DESCRIPTION OF THE INVENTION

Figure 1:
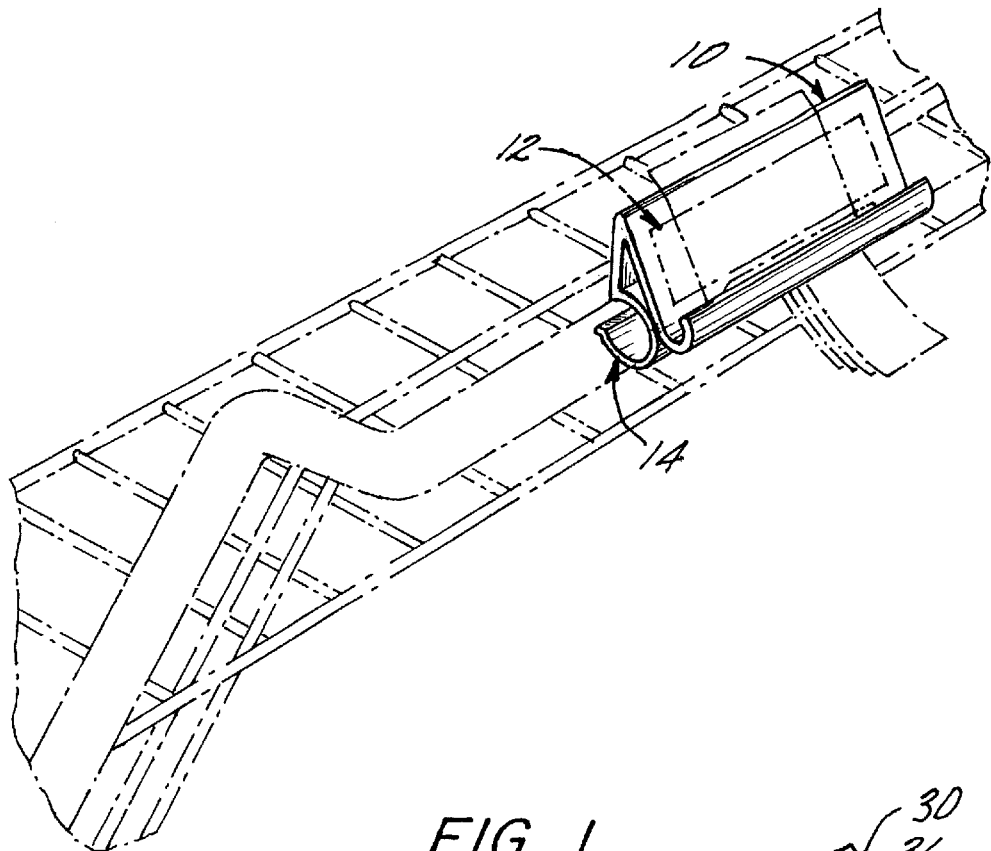
FIG. 1 is a perspective view of a first embodiment of a shopping cart list, coupon, circular holder with indicia display area device in accordance with the present invention shown mounted to a portion of a shopping cart, that portion of the shopping cart shown in phantom.
Figure 2:
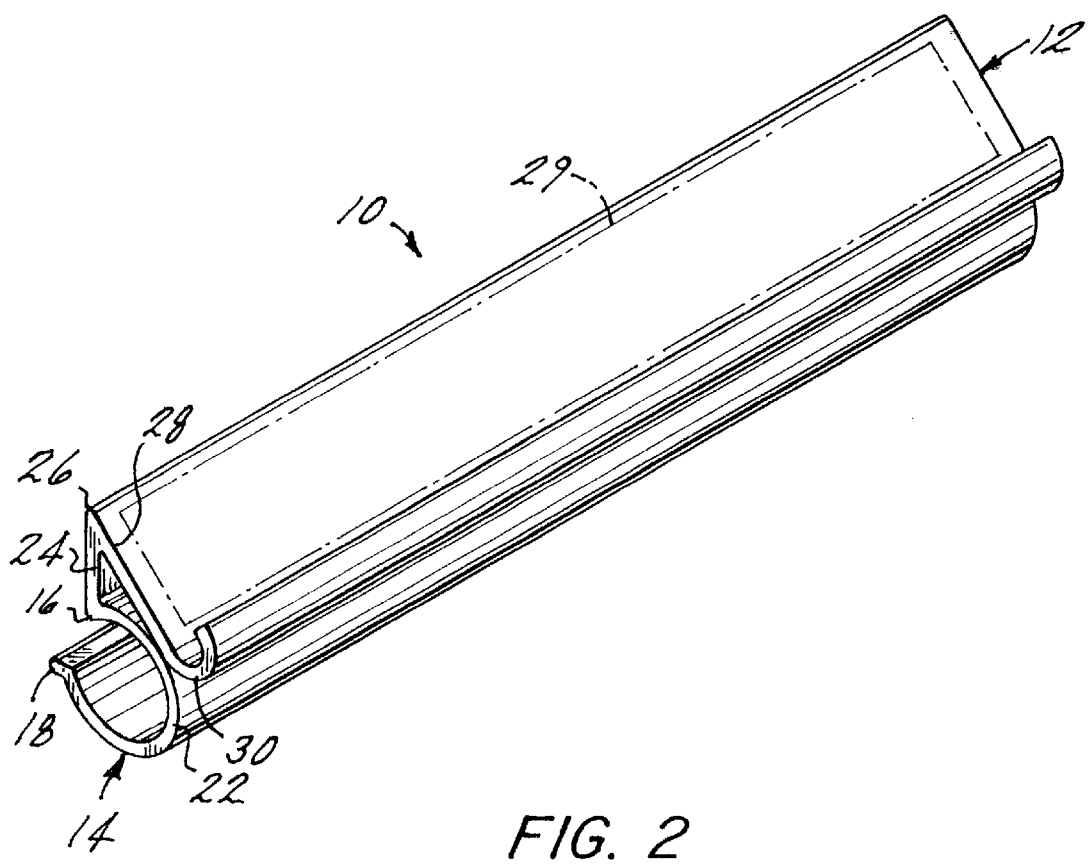
FIG. 2 is a second perspective view of the device of FIG. 1.

Referring first to FIGS. 1 and 2, a shopping cart attachment having an indicia display area in combination with a shopping list, coupon, circular holder of a first embodiment of the present invention is shown generally at 10. Device 10 comprises two basic elements. These two elements are a cart handle clamp 12 and a list, coupon and circular holder element 14 which has an indicia display area and generally comprises a clipping mechanism. The main purpose and functions for the prior devices as to provide convenience for the shopper and, therefore, be beneficial to the store by way of increased customer satisfaction. Device 10 not only fulfills this prior art need, but, in contrast, has the added advantageous feature of promoting the sales of a particular item at relatively small cost delivered to the shopper at the point at which such purchasing decisions are made.

Figure 3A:
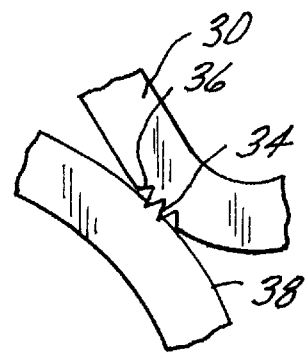
FIG. 3A is an exploded view of a portion of the device of FIG. 1 taken along the circle 3A of FIG. 3.
Figure 3:
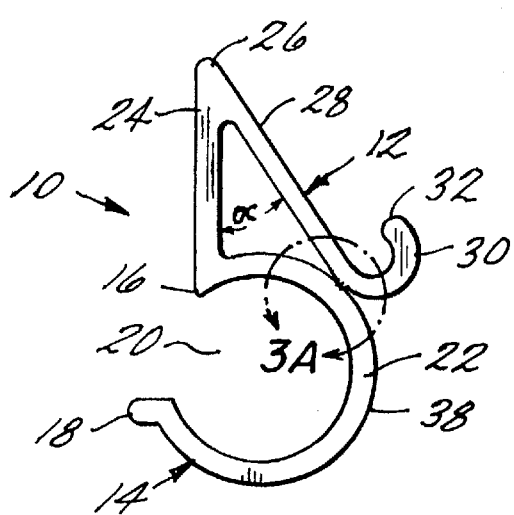
FIG. 3 is a left side elevation view of the device of FIG. 1.

Referring now to FIGS. 3 and 3A, device 10 is preferably manufactured by an extrusion process to keep costs of manufacturing at a minimum. Of course, it is within the scope of the present invention that any other low cost, suitable method known in the art can be used such as an injection molding process.

Handle clamp 12 comprises an arcuate longitudinal member and preferably has an inside diameter of approximately 1 inch which extends circularly from an upper throat tip 16 around to a lower pull lip 18 which is located distally from upper throat tip 16 in the vertical plane preferably 0.550 inches apart, creating a throat space 20 which is the space which allows lower pull lip 18 to be deflected far enough apart from upper throat tip 16 to snap-lockedly install device 10 on to a shopping cart handle (not shown except in phantom in FIG. 1). More specifically, the arcuate shape of handle clamp 12 is structured to engage the handle of the shopping cart. The portion of handle clamp 12 which extends circularly between upper throat tip 16 and lower pull lip 18 comprises an arcuate wall 22 having a thickness of preferably about 0.120 inches.

An extension wall 24 extends upwardly from upper throat tip 16 to a top reverse edge 26. Preferably, extension wall 24 has a length of about 1.30 inches. From top reverse edge 26, an indicia wall 28 extends downwardly angularly so that an angle α is formed between extension wall 24 and indicia wall 28. Preferably, angle α is between about 25° to about 40° and more preferably between about 30° and about 35°. Indicia wall 28 angularly extends downward so that indicia wall 28 contacts tangentially the outer circumference 38 of handle clamp 12. Indicia wall 28 includes an indicia advertising area 29, shown with phantom lines in the FIGURES, which is intended to receive the advertising medium. For example, the advertising medium may comprise a glossy advertisement having an adhesive backing which easily affixes to indicia advertising area 29. It being understood that as the length of extension wall 24 is increased, the length of indicia wall 28 likewise increases to provide more surface area to display advertisements and the like. In addition, it is within the scope of the present invention that indicia wall 28 and extension wall 24 may be connected by a hinge mechanism or by a spring mechanism (not shown) causing indicia wall 28 to be urged against handle clamp 12 in an intimate manner.

Indicia wall 28 extends beyond this contact point of outer circumference handle clamp 12 and terminates in a semi-circular pull lip 30. The inside radius of semi-circular pull lip 30 is preferably about 0.13 inches and the wall of semi-circular pull lip 30 terminates in a head 32 that is preferably about 0.15 inches in diameter. It being understood that pull lip 30 may alternatively have other shapes, e.g., generally arcuate or "V" shaped. The vertical distance between top reverse edge 26 and the outside diameter of semi-circular pull lip 30 is preferable about 1.32 inches. It should be noted and understood that the above-discussed dimensions of device 10 are not critical to the practice of the present invention and are recited for illustration purposes only and it is within the scope of the invention that device 10 may be formed having other suitable dimensions.

Device 10 includes serrated contact grooves (teeth) 34, 36 which are located respectively at the tangential contact point between handle clamp 12 and circular holder element 14. These grooves 34, 36 number two or any other suitable number and alignment of grooves 34, 36 is not critical. Preferably, grooves 34, 36 are complementary to one another and interengage one another in a closed position. Grooves 34, 36 serve to securely hold a shopping list, coupon, or other similar item which is inserted therebetween by slightly pulling head 32 away from handle clamp 12 so that grooves 34, 36 separate sufficiently for the shopping list, coupon, or the like to be inserted and upon the release of head 32, the resiliency of circular holder element 14 causes it to return to contacting handle clamp 12, thereby causing grooves 34, 36 to engage one another again and securely pinch and hold an item placed therebetween. It should be noted that the geometry of contact grooves 34, 36 may be of any other suitable shape such as oval or square. The length of device 10 is preferably about 7 inches overall and any suitable color may be used. Device 10 is formed from any number of suitable materials which provide the desired characteristics described herein and preferably, comprises a thermoplastic material. In an exemplary embodiment, device 10 is formed from medium-impact polystyrene and more preferably, is formed from ABS polymers using an extrusion process. It being understood that it is within the scope of the invention that a number of polymeric materials may be used to manufacture device 10 and the polymeric materials may further include additives known in the art including but not limited to ultra-violet light absorbers, polymerization initiators, and polymerization accelerators.

In accordance with the present invention, device 10 preferably comprises an integral, unitary piece which is easily manufactured and easily used by the shopper.

Now turning to FIG. 4 which is a right side elevation view of a second embodiment of the present invention, generally designated as 10'. Device 10' is very similar to device 10 of FIGS. 1–3A with the exception that device 10' does not include serrated grooves 34, 36 to grip and securely hold therebetween the shopping list, coupon, or the like. FIG. 5 illustrates a front elevation view of device 10' and is self-explanatory.

Now turning to FIGS. 6 and 7, a third embodiment of a shopping cart attachment having an indicia display area in combination with a list, coupon circular holder in accordance with the present invention is shown generally at 50. Similar to the previous embodiment, device 50 comprises a cart handle clamp 52 and indicia area and list, coupon and circular holder element 54 (clip mechanism). Handle clamp 52 preferably has an inside diameter of approximately 1 inch which extends circularly from an upper throat tip 56 to a lower throat tip 58 which is located distally from upper throat tip 56 in the vertical plane preferably about 0.550 inches apart, creating a throat space 60. Throat space 60 is intended to receive the shopping cart handle (not shown) and because of the resiliency of device 10, lower throat tip 58 is adapted to be deflected far enough apart from upper throat tip 56 to snap-lockedly install device 50 onto the shopping cart handle. An arcuate wall 62 extends circularly between upper throat tip 56 and lower throat tip 58 comprises a portion of handle clamp 52 which contacts and seats against the shopping cart handle during use.

Handle clamp 52 includes an outer circumference 64 and an arm 66 extends upwardly from a top portion of outer circumference 64 near upper throat tip 56 to indicia area and list, coupon, and circular holding element 54. Arm 66 serves to integrally connect handle clamp 52 and circular holding element 54. Circular holding element 54 includes an indicia wall 68 which extends from a top edge 70 and angularly extends downward so that indicia wall 68 contacts tangentially outer circumference 64 of handle clamp 52. Indicia wall 68 extends beyond this contact point on outer circumference 64 of handle clamp 52 and terminates in a semi-circular pull lip 72. Top edge 70 extends beyond upper throat tip 56 and between top edge 70 and the location where indicia wall 68 noticeably extends angularly downward, an outer surface 71 is formed which is intended to receive an advertisement or other indicia. The inside radius of semi-circular pull lip 72 is preferably about 0.125 inches and the wall of semi-circular pull lip 72 terminates in a head 74 that is preferably about 0.150 inches in diameter. It being understood that these dimensions are listed for purposes of illustration only and do not limit in any way the scope of the present invention. Semi-circular pull lip 72 serves a variety of functions. Semi-circular pull lip 72 provides an elongated area which functions as a writing implement holder which supports and secures a pencil, pen, or other writing implement. This permits the user of device 50 to conveniently make additions, deletions, or notes on a shopping list or other paper which is releasably retained by device 50 in accordance with the present invention. Semi-circular pull lip 72 also serves to provide a pulling member which the user of device 50 can easily grip and pull outwardly away from handle clamp 52 and disengage indicia wall 68 from outer circumference 64 to create an opening therebetween which is intended to receive the shopping list, coupons, circular, etc.

Furthermore, indicia wall 68 includes a rib 75 which extends toward outer circumference 64 of handle clamp 52 and is located at the tangential contact point between handle clamp 52 and circular holding element 54. Rib 75 complements and engages a similarly shaped recess 76 formed in outer circumference 64 of handle clamp 52. Rib 75 and recess 76 serve to securely hold a shopping list, coupon, or other similar item which is inserted therebetween by slightly pulling head 74 of semi-circular pull lip 72 away from handle clamp 52, thereby causing rib 75 to separate from recess 76 and create the opening therebetween which receives the shopping list, coupon, circular, etc. Due to the resiliency of device 50 and more specifically, indicia wall 68, rib 75 returns to its original position within recess 76 after the user no longer pulls semi-circular pull lip 72 away from handle clamp 52, thereby securely retaining paper(s) inserted between rib 75 and recess 76.

Now turning to FIGS. 8 and 9, a fourth embodiment of a shopping cart attachment having an indicia display area in combination with a list, coupon circular holder in accordance with the present invention is shown generally at 100. Similar to the previous embodiments, device 100 comprises a cart handle clamp 102 in combination with an indicia area and list, coupon and circular holder element 104. Handle clamp 102 preferably has similar exemplary dimensions as element 12 of FIGS. 1–4. Handle clamp 102 extends circularly from a top reverse edge 105 to a lower throat tip 106 which is located distally from top reverse edge 105 in a vertical plane to create a throat space 108. Throat space 108 receives the shopping cart handle (not shown) and due to its resiliency, device 100 is adapted to be snap-lockedly installed onto the shopping cart handle, as described hereinbefore with reference to the previous FIGURES. Handle clamp 102 is formed in part by an arcuate wall 110 which extends between top reverse edge 104 and lower throat tip 106, wherein arcuate wall 110 has an outer circumference 112.

Circular holding element 104 comprises a tongue 114 which radially extends from top reverse edge 104 and terminates in a pull lip 116, wherein tongue 114 is arcuate in nature and provides an outer indicia display surface 117 which is intended to display advertisements or the like. An opening 118 is formed between tongue 114 and outer circumference 112 and is sized to receive the shopping list, coupons, circular, and the like. Tongue 114 includes a slight ridge 120 formed between top reverse edge 104 and pull lip 116, wherein ridge 120 is received in a complementary, similarly shaped groove 122 formed in outer circumference 112 of handle clamp 102. Ridge 120 and recess 122 serve to securely retain any papers which are disposed therebetween when tongue 114 is slightly pulled open to permit the papers to be inserted therebetween. Members 120 and 122 provide a rough surface to engage the papers and releasably retain them in device 100.

More specifically, tongue 114 is a resilient member which permits the user to slightly open tongue 114 by lifting pull lip 116 in a direction away from handle clamp 102 and in a direction generally away from the shopping cart handle. The resiliency of tongue 114 causes it to return to its original position and thereby securely retains the papers in a releaseable manner after the user releases pull lip 116.

Now turning to FIGS. 10–15, a fifth embodiment of a shopping cart attachment having indicia display area in combination with a list, coupon circular holder in accordance with the present invention is indicated generally at 200. Device 200 comprises a cart handle clamp member and an indicia display and list, coupon and circular holder member. More specifically, device 200 includes a support member 206 having a first end 208 and an opposing second end 210. Integrally formed within support member 206 is a tongue 212 having a fixed first end 213 and a free second end 215. Second end 215 is proximate second end 210 of support member 206 and terminates in an outwardly flared lip 214. It being understood that an opening 216 is formed between an upper surface 218 of planar support member 206 and tongue 212. At second end 210, upper surface 218 has a slight recess 220 which receives a complementary rib 222 which is formed on tongue 212 at second end 212. Because tongue 212 comprises a resilient member, rib 222 is received in recess 220 during normal use of device 200 due to the resilient forces of tongue 212. Opening 216 is intended to receive a shopping list, coupon, or similar item which is inserted between tongue 212 and upper surface 218 of support member 206. A shopping list, coupon, or the like are inserted between tongue 212 and planar support member 206 by slightly pulling tongue 212 away from support member 206. Outwardly flared lip 214 is designed to assist the user in pulling tongue 212 away from support member 206. Upon the release of tongue 212, the resiliency of tongue 212, as described hereinbefore, causes it to return to support member 206 thereby causing rib 222 to engage recess 220 and securely pinch and hold an item placed between rib 222 and recess 220. It should be noted that the geometry of rib 222 and recess 220 may be of any suitable shape.

Figure 10:
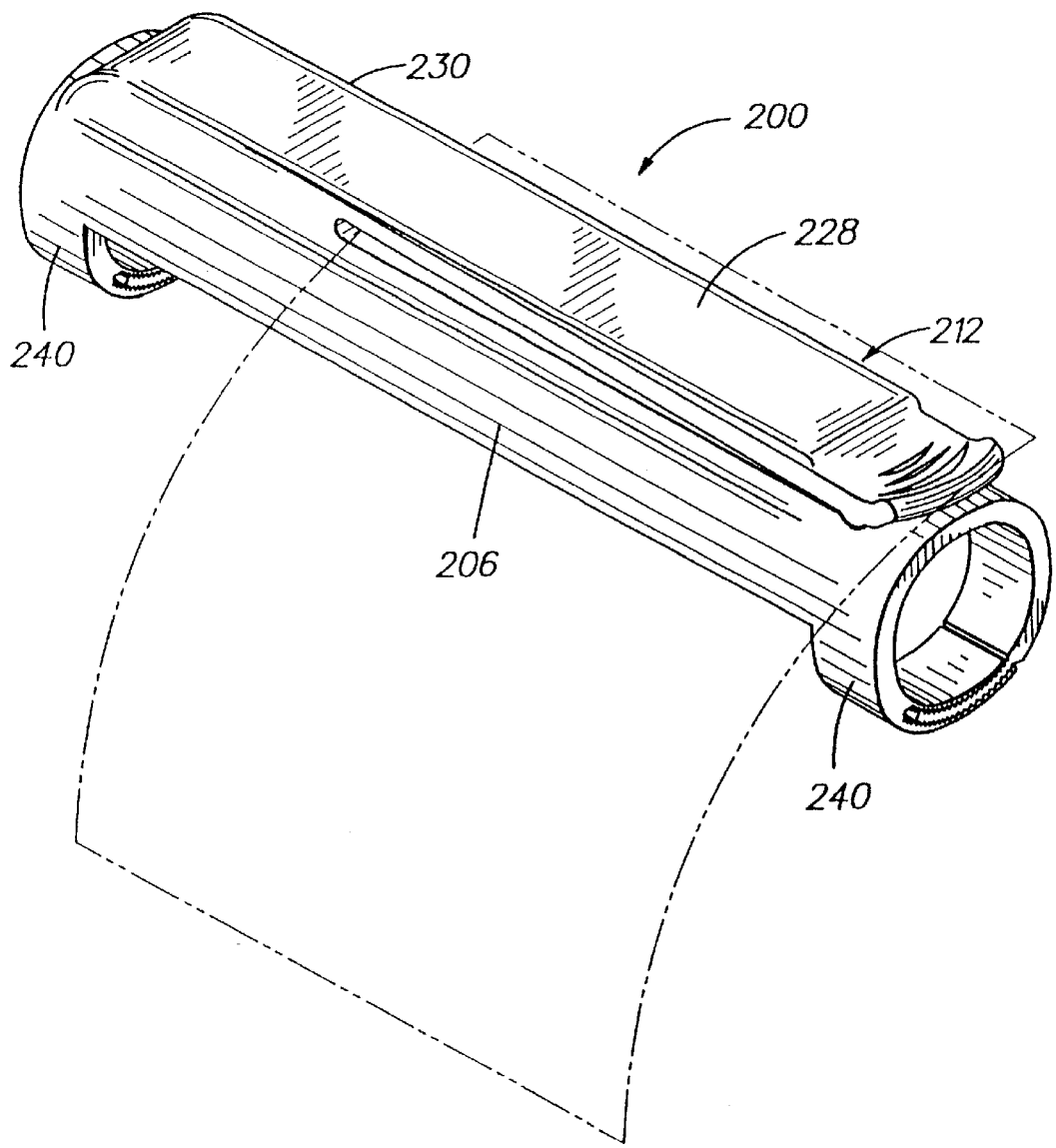
FIG. 10 is a front perspective view of a fifth embodiment of a shopping cart list, coupon, circular holder with indicia display area device of the present invention in a clamped position.
Figure 11:
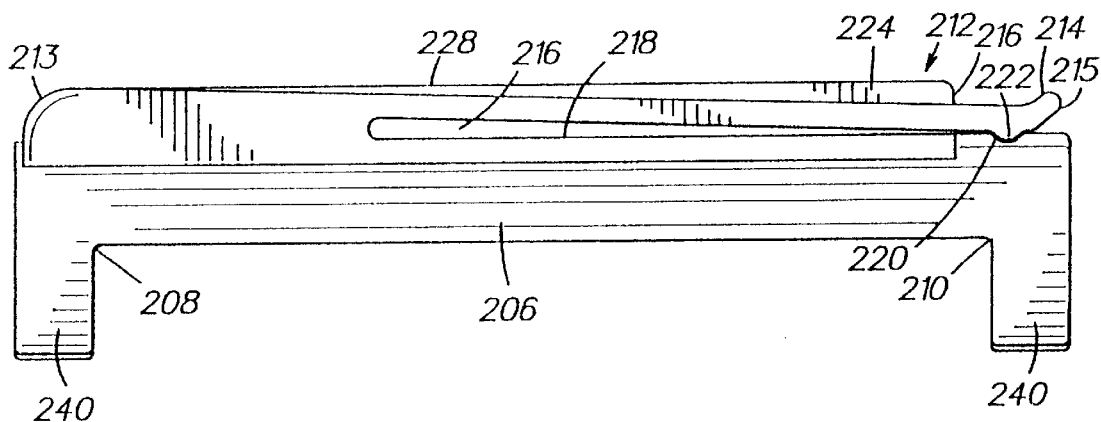
FIG. 11 is front elevation view of the device of FIG. 10.
Figure 12:
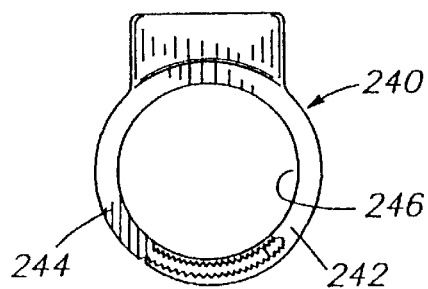
FIG. 12 is a left end view of the device of FIG. 10
Figure 13:
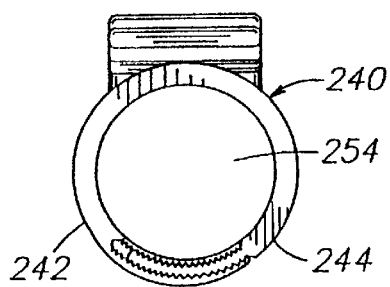
FIG. 13 is a right end view of the device of FIG. 10.
Figure 14:
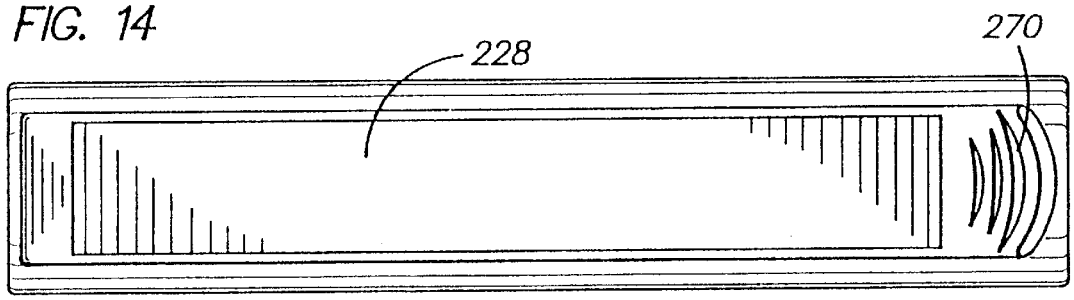
FIG. 14 is a top plan view of the device of FIG. 10.

As best shown in FIGS. 10 and 11, tongue 212 includes a raised portion 224 which forms an shoulder 226 proximate second end 215. Raised portion 224 is an integral part of tongue 212 and is designed to create a smooth planar upper surface 228 which extends from first end 213 to the end of raised portion 224 at shoulder 226. Planar upper surface 228 is preferably parallel to upper surface 218 of support member 206. Planar upper surface 228 may further include a perimetric lip 230 which extends around the periphery of planar upper surface 228. Because planar upper surface 228 is parallel to upper surface 218 of support member 206 during normal use of device 200 when item(s) may be inserted between rib 222 and recess 220, planar upper surface 228 is intended to act as a surface area to receive and display advertisements and the like. In FIG. 14, the area of planar upper surface 228 which is intended to receive and display advertisements and the like is generally. In an exemplary embodiment, this area is approximately about 0.900 inches wide and 5.779 inches in length. Raised portion 224 permits an advertisement to lie thereon in a plane parallel to a plane containing upper surface 218 of support member 206 and thus a consumer can easily view the advertising medium which is disposed on planar upper surface 228. Tongue 212 and planar upper surface 228 which forms a part thereof are generally rectangular in shape in one exemplary embodiment. As shown in FIG. 14, a plurality of ridges 270 are formed in tongue 212 to assist the user in gripping tongue 212 and pulling it away from support member 206.

Referring to FIGS. 10–15, at first end 208 and second end 210 of planar support member 206, cart handle clamp members are integrally formed with support member 206. Cart handle clamp members removably attach device 200 to a shopping cart handle so that planar upper surface 228 faces upward away from the cart handle and toward the consumer. In one exemplary embodiment, cart handle clamp members comprise a pair of open-ended, substantially annular bands 240 having a pair of integral, opposed interlockable members 242 and 244 disposed at its ends for securing to a handle, e.g., shopping cart handle (not shown). Clamp members have a substantially smooth inside surface 246 extending along the entire length of bands 240.

The first interlockable member 242 includes a first arcuate jaw 248 and a resilient biasing tongue 250. First arcuate jaw 248 and first resilient biasing tongue 250 are supported in a cantilevered manner from a support portion 251 and resilient biasing tongue 250 is preferably disposed radially inward from and substantially parallel to first arcuate jaw 248 so that an opening is formed therebetween. Both first arcuate jaw 248 and resilient biasing tongue 250 include a plurality of parallel sawtoothed projections or teeth 252 disposed on inner surfaces of first arcuate jaw 248 and resilient biasing tongue 250, wherein the plurality of teeth 252 on one of first arcuate jaw 248 and resilient biasing tongue 250 face the other of first arcuate jaw 248 and resilient biasing tongue 250. Teeth 252 on first arcuate jaw 248 and resilient biasing tongue 250 provide interconnecting engagement with cooperating second interlockable member 244 upon being interconnected around an annular object, e.g., a shopping cart handle, which is captured within an opening 254 defined by band 240.

Second interlockable member 244 is similar to first interlockable member 242 but is orientated complementary to first interlockable member 242, wherein first interlockable member 242 has a second arcuate jaw 256 which integrally extends from one end of band 240. Second arcuate jaw 256 includes a plurality of parallel sawtoothed projections or teeth 258 on both an inner surface and outer surface of second arcuate jaw 256. Teeth 258 are adapted for interconnecting engagement with cooperating first interlockable member 242 upon being interconnected around the substantially annular object, e.g., shopping cart handle. Teeth 258 on the inner surface of second arcuate jaw 256 project toward resilient biasing tongue 250 and teeth 258 on the outer surface of second arcuate jaw 256 project toward first arcuate jaw 248. Teeth 258 are complementary in dimension and number to teeth 252 to provide an interlocking connecting therebetween by orientating teeth 258 in an opposite direction of teeth 252. In an exemplary embodiment, interlockable members 242 and 244 have a width of about 0.500 inches and the distance between the inner portions of interlockable members 242 and 244 is about 6 inches. The overall length of device 200 is about 7 inches.

Figure 15:
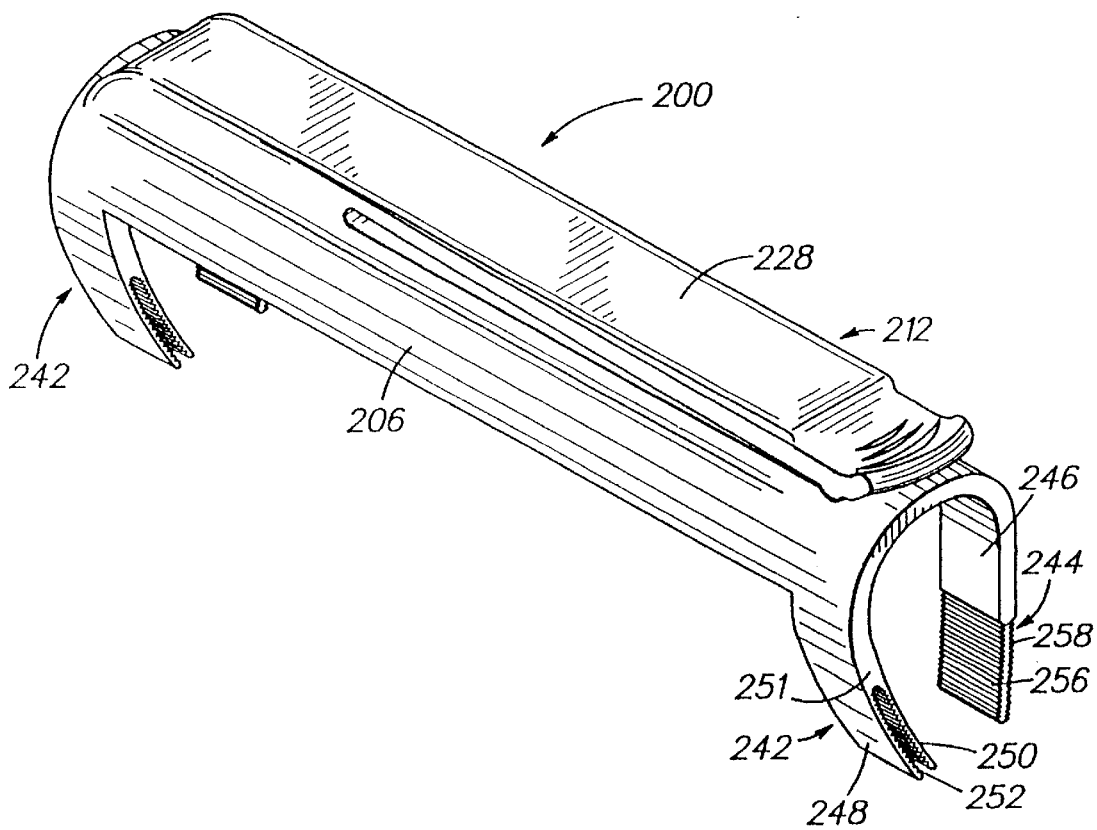
FIG. 15 is a front perspective view of the device of FIG. 10 in an open position.

FIG. 15 is a front perspective view of device 200 in an open position prior to clamping interlockable members 244 and 246 around a handle of a shopping cart.

Figure 16:
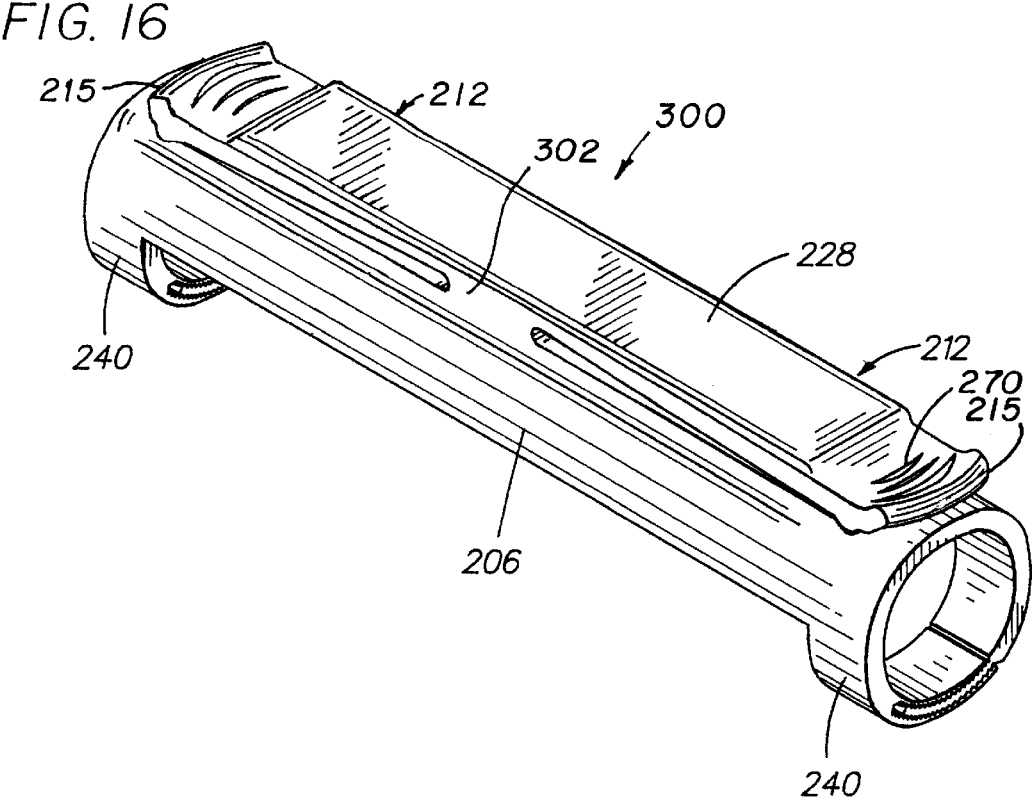
FIG. 16 is a front perspective view of a sixth embodiment of a shopping cart list, coupon, circular holder with indicia display area device of the present invention in a clamped position.
Figure 17:
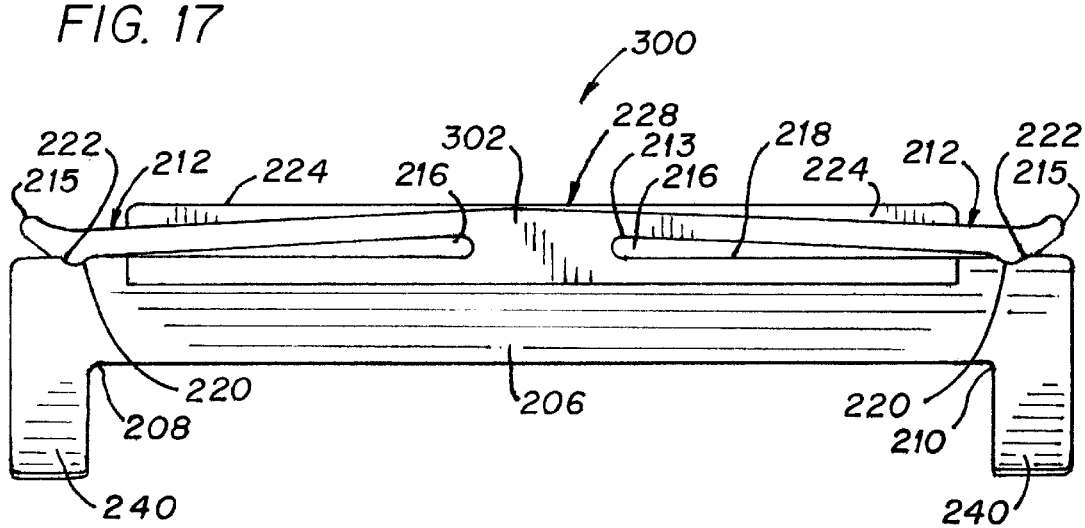
FIG. 17 is a front elevation view of the device of FIG. 16.

Now turning to FIGS. 16–17, a sixth embodiment of a shopping cart attachment having indicia display area in combination with a list, coupon circular holder in accordance with the present invention is indicated generally at 300. Device 300 is similar to device 200 of FIGS. 10–15 with the exception that planar support member 206 of device 200 includes a dual sided tongue 212 formed therewith. More specifically, a pair of tongues 212 are integrally formed with planar support member 206 with open second ends 215 of the tongues 212 extending outward from a center tongue support 302 which is centrally located in relation to planar support member 206. Fixed first ends 213 of tongues 212 converge and integrally join center tongue support 302. Center tongue support 302 is preferably integrally formed with upper surface 218 of planar support member 206. Due to having a pair of tongues 212, a pair of openings 216 are formed between the upper surface 218 of planar support member 206 and tongues 212. The pair of openings 216 are intended to receive a shopping list, coupon, or similar item which is inserted between tongues 212 and upper surface 218 on either end of device 300. The resilient nature of the pair of tongues 212 causes tongues 212 to urge against planar support member 206 during normal use Additional features of device 300 may be understood in more detail by referring to the description set forth previously with respect to FIGS. 10–15. For example, raised portions 224 extend away from center tongue support 302 to form planar upper surface 228 which receives and displays indicia, such as advertisement medium. By having a pair of tongues 212, a consumer may separate their papers and place a shopping list or the like on one side and coupons and the like on an opposite side.

As previously discussed hereinbefore, the present invention is of such low cost that it can be virtually given away to a store without cost to that store but allow the device of the present invention to both serve as a list, coupon, circular holder and achieve its other main function of indicia display advertising. This indicia display advertising would preferably be updated monthly (or any other suitable time frame) to promote featured items to the shopper at the location in plain sight of the shopper's eyes, where studies have shown is the point where most buying decisions take place.

The shopping cart attachment of the present invention is designed as to have an indicia advertising surface (area), be capable of holding coupons, shopping lists, circulars and the like; be easily installed permanently to a shopping cart handle by snap lockable means and be of low cost so that the cost of such a device would negligible compare to the benefits of advertising to store and convenience to the shopper. This makes the shopping cart attachment both desirable to have on its carts by the store and useful for the store's shoppers.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A shopping cart attachment for use with a shopping cart having a handle, comprising:

a first support member having a first end, an opposing second end, and an upper surface;

a center support member centrally located on the upper surface of the first support member;

a pair of tongues, each having a first end integrally formed with the center support member and an opposing second end extending away from the center support member so that an opening is formed on either side of the center support member between the upper surface of the first support member and the tongue, the second end of the tongue urging against the upper surface of the first support member; and a pair of open-ended substantially annular bands, a first band at said first end of said first support member and a second band at said opposing second end of said first support member, each band having first and second opposed interlockable members disposed at the open ends thereof, the pair of open-ended substantially annular bands for receiving the handle of the cart.

2. The shopping cart attachment of claim 1, wherein the second end of the tongue includes a rib extending outwardly from the tongue towards the upper surface of the first support member, the upper surface of the first support member including a recess which is complementary to and which receives the rib.

3. The shopping cart attachment of claim 1, wherein the pair of tongues, each includes a raised portion extending away from the center support member toward the second end of the tongue so that the first end of the tongue and the raised portion are in a first plane.

4. The shopping cart attachment of claim 3, wherein the upper surface of the first support member is in a second plane which is parallel to the first plane.

5. The shopping cart attachment of claim 1, wherein the raised portion and the first end of the tongues comprise a planar platform to receive and display indicia.

6. The shopping cart attachment of claim 1, wherein the first interlockable member includes a support member, a first arcuate jaw, and a resilient biasing member, the first arcuate jaw and the resilient biasing member extending from the support member, the first arcuate jaw and the resilient biasing member each having a plurality of teeth adapted for interconnecting engagement of the first and second interlockable members.

7. The shopping cart attachment of claim 1, wherein the second interlockable member includes a second arcuate jaw having a plurality of teeth formed on both an inner surface and an outer surface of the second arcuate jaw, the plurality of teeth adapted for interconnecting engagement of the first and second interlockable members.

8. The shopping cart attachment of claim 6, wherein the resilient biasing member comprises:

a cantilevered tongue extending from the support element, the cantilevered tongue producing a force against the second arcuate jaw of the second interlockable member to maintain the teeth of the first arcuate jaw, the second arcuate jaw, and the resilient biasing member in interlocking engagement.

* * * * *